United States Patent [19]
Kondo

[11] Patent Number: 5,151,898
[45] Date of Patent: Sep. 29, 1992

[54] SYNCHRONIZED SLAVE STATION CONNECTION APPARATUS FOR A DATA COMMUNICATION NETWORK

[75] Inventor: Haruhiko Kondo, Aichi, Japan

[73] Assignee: Mitsubishi Denki K.K., Tokyo, Japan

[21] Appl. No.: 606,974

[22] Filed: Oct. 31, 1990

[30] Foreign Application Priority Data

Feb. 5, 1990 [JP] Japan ................... 2-25601

[51] Int. Cl.⁵ .................. H04J 3/02; H04L 12/42
[52] U.S. Cl. .................. 370/85.15; 370/85.3; 340/825.05
[58] Field of Search .............. 370/16, 16.1, 85.15, 370/85.3, 85.12, 85.1, 55; 340/825.05; 200/43.02; 364/138, 131

[56] References Cited

U.S. PATENT DOCUMENTS

| | | | |
|---|---|---|---|
| 4,468,767 | 8/1984 | Warren et al. | 370/55 |
| 4,514,841 | 4/1985 | Sem-Sandberg | 370/55 |
| 4,623,884 | 11/1986 | Ihara et al. | 370/16.1 |
| 4,779,261 | 10/1988 | Yamagishi et al. | 370/16 |
| 4,899,142 | 2/1990 | Nakayashiki et al. | 370/16 |
| 4,956,836 | 9/1990 | Boatwright | 370/16.1 |
| 5,018,135 | 5/1991 | Ashi et al. | 370/55 |

FOREIGN PATENT DOCUMENTS 104339 5/1987 Japan .

Primary Examiner—Douglas W. Olms
Assistant Examiner—H. Kizou
Attorney, Agent, or Firm—Sughrue, Mion, Zinn, Macpeak & Seas

[57] ABSTRACT

A ring-shaped data communications network in which plural slave stations and a master station are serially connected in a closed loop via transmission lines, the slave stations being removably connected to the loop without affecting the continuity of data transmission on the loop. A connection box, permanently connected into the loop and adapted to receive the removable slave station, has circuitry for switching the data loop paths through the slave station. Switching of the data loop occurs when the slave station has been physically connected to the connection box and when a non-communicating portion of the data stream in the loop has been received at the connection box. Apparatus for detecting the connection of the slave station to the box and for detecting the absence of information in the data stream controls operation of the switching.

15 Claims, 3 Drawing Sheets

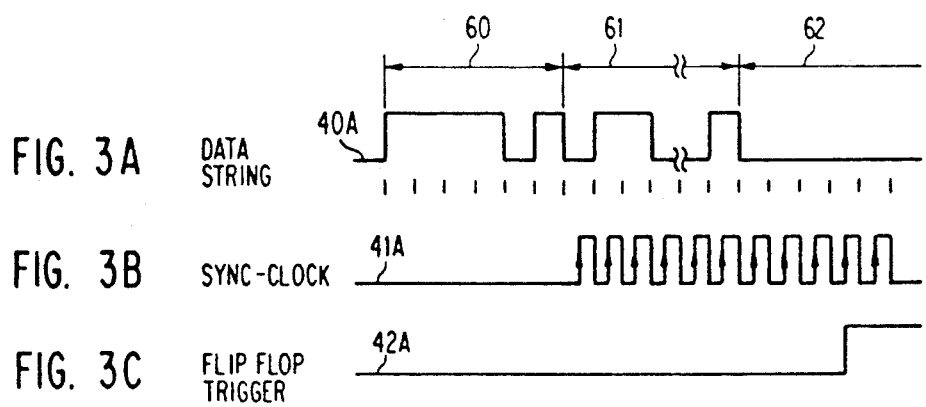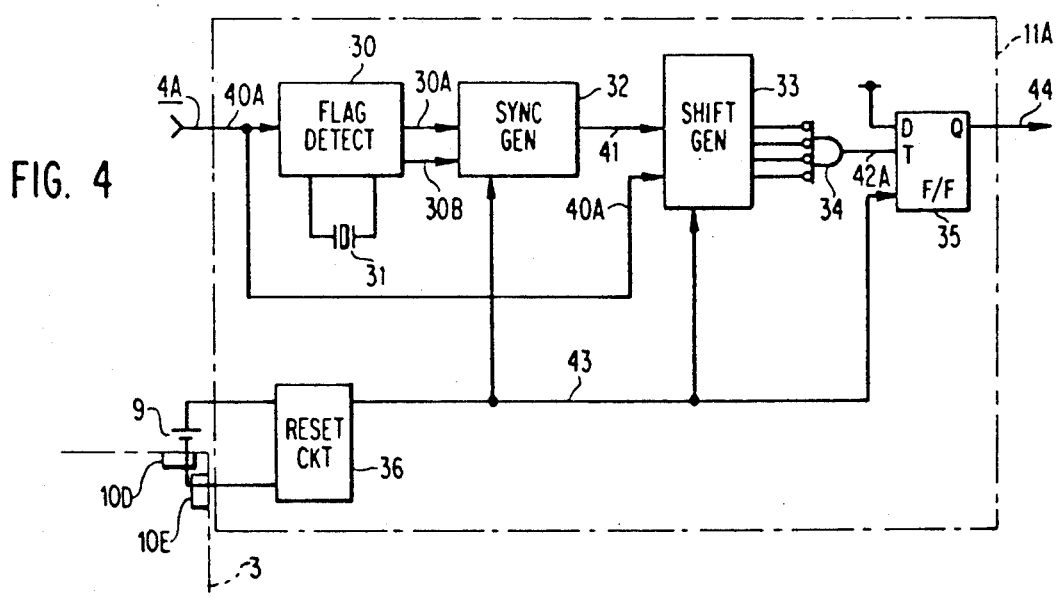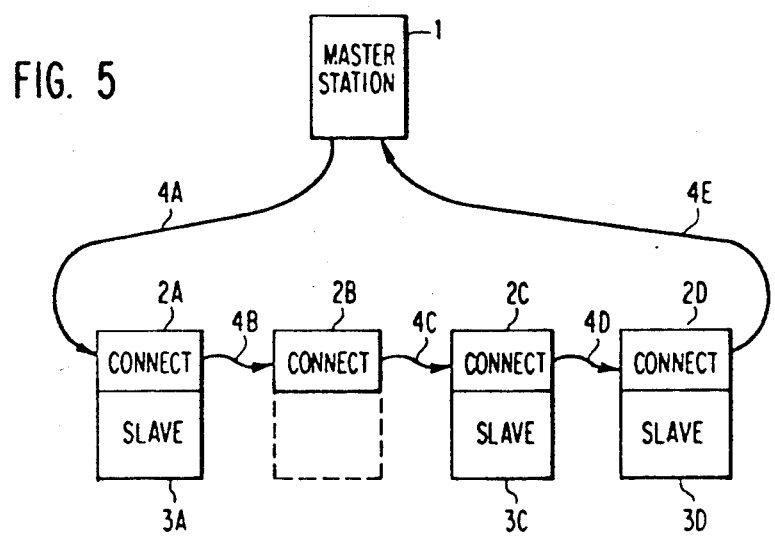

SYNCHRONIZED SLAVE STATION CONNECTION APPARATUS FOR A DATA COMMUNICATION NETWORK

BACKGROUND OF THE INVENTION (1) Field of the Invention

The present invention relates to a ring-shaped data communication network in which plural slave stations and a master station are serially connected in a closed loop via transmission lines.

(2) Description of the Background Art

For data communication applications, a closed loop communication system often is used to transfer information in the form of data strings composed of serial data, via a transmission line, between a master station and a plurality of slave stations.

FIG. 5 illustrates the general configuration of this type of data communication system. Referring to FIG. 5, a master station 1 and several connection boxes 2A–2D are connected into a ring-shaped network by a plurality of transmission cables 4A–4E, acting as data transmission lines connecting adjacent ones of the master station 1 and the connection boxes 2A–2D in series. Portable data communication terminals 3A, 3C and 3D serve as slave stations, which are removably connected to the connection boxes 2A, 2C and 2D, respectively. A data communication apparatus is comprised of one slave station and its connection box.

FIG. 6 is a block diagram illustrating the configuration of a data communication apparatus which is known in the art and is comprised of the connection box 2A and the slave station 3A shown in FIG. 5. In FIG. 6, switching device 6 is incorporated in the connection box 2A for switching from one data transmission line to another by moving a contact 6A from position A to position B when a coil 6B is excited. A communication interface circuit is incorporated in the slave station 3A for transferring data to and from the master station 1 via the ring-shaped network. Each data communication apparatus has several terminals 10A–10H for connecting corresponding signals with the connection box 2A. Jumper 8 is connected across terminals 10D and 10E of the connection box 2A for purposes that will be defined later. Power is fed from supply 9, located outside box 2A, for driving the switching device 6.

FIG. 7 shows the transmission frames of a data string sent by the master station 1. The data string is led by a flag 60 representing data transmission "start". There are "n" bits per station such that the data string for "m" stations comprises "n x m"-bits of data 61 plus an idle space 62 wherein there is no information transmission. The size of the idle space is selected for a given transmission rate to provide a sufficient duration for processing of the transmitted data at a receiving station.

FIG. 8 illustrates the details of the transmission frame in FIG. 7, wherein the flag 60 and the data 61 together comprise a serial data string composed of "1"s and "0"s, and the idle space 62, indicating a no-communication state, is represented by a succession of "0"s. In particular, the data string is divided into a flag waveform 60A composed of a flag sequence such as "111101", a data waveform 61A composed of trapezoidal pulses, and an idle waveform 62A having a succession of "0"s. The idle period generally encompasses at least 4 bits, representing a minimum duration of 1 ms.

Operation of the prior art data communication apparatus will now be described with reference to FIGS. 6 to 8. Referring to FIG. 6, when the slave station 3A is not connected with the connection box 2A, the terminals 10D and 10E of the connection box 2A are disconnected from each other. Since the terminals 10D and 10E are disconnected from each other in relation to the switching device 6, the voltage of the switching device driving power supply 9 is not applied to the switching device 6 and the contact 6A of the switching device 6 is in position A. Hence, the data transmission line 4A is linked to the data transmission line 4B to the next station in the ring-type network, via the contact 6A of the switching device 6. That is, the connection box 2A bypasses the slave station 3A and the data string transmitted by the master station 1 is transmitted intact to the next station.

When the slave station 3A is connected with the connection box 2A, the terminals 10D and 10E are connected to each other by the jumper 8 in the slave station 3A, voltage is applied from the switching device driving power supply 9 to the switching device 6, and the contact 6A of the switching device 6 is changed from position A to position B. When the contact 6A is switched from position A to position B, the connection box 2A is set to a slave station insert state, the data receive terminal of the slave station 3A is connected with the data transmission line 4A from the preceding station, and the slave station 3A is then ready to receive data from the master station 1.

The data transmission frames are sent as a data string by the master station 1 by reading data from a data "frame" relevant to itself and/or writing its own data to the frame. The data no-communication state, referred to as the "idle" space 62, exists behind the final communication frame, i.e., after the (flag)+(n x m bits). The space 62 has a succession of four or more "0"s and continues for one or more ms.

A problem arises when the slave station is connected with the connection box and the data transmission line switches from the slave station bypass state to the slave station insert state, without regard for the presence on the data transmission line of a data string transmitted by the master station. In this case, the data string is likely to be interrupted. When the succeeding slave stations and the master station receive the interrupted data string, a communication error will result.

It is accordingly an object of the present invention to overcome the disadvantages in the prior art by providing a data communication apparatus which can switch a data transmission line from a slave station bypass state to a slave station insert state without interrupting a data string transmitted by a master station when a slave station is connected with a connection box.

It is a further object of the present invention to provide a data communication apparatus that will switch a data transmission line from a slave station bypass state to a slave station insert state upon detection of a predetermined signal pattern in a data string transmitted by a master station.

It is yet another object of the present invention to provide a data communication apparatus at each of a plurality of stations on a ring type network that will switch a data transmission line from a slave station bypass state to a slave station insert state at the same relative time during reception of a data string transmitted by a master station.

SUMMARY OF THE INVENTION

The present invention relates to a data communication apparatus that includes a connection box connected into a ring-shaped network by data transmission lines and a slave station removably connectable with the connection box and operative to communicate with a master station in the network via the data transmission lines. The connection box comprises a slave station connection detecting circuit for judging that the slave station has been connected with the connection box. A no-communication state detecting circuit can detect a no-communication state from the content of a data string transmitted by the master station along the network ring when a slave station connection is judged by the slave station connection detecting circuit. A data transmission line switching circuit is used for switching the data transmission line from a slave station bypass state to a slave station insert state when there is a detection of the no-communication state by the no-communication state detecting circuit.

According to the present invention, the slave station connection detecting circuit, included in the connection box connected into the ring shaped network, judges whether a removably connectable slave station actually has been connected with the connection box. The no-communication state detecting circuit, also included in the connection box, detects the no-communication state from the data string transmitted by the master station via the data transmission line. The data transmission line switching circuit switches the data transmission line from the slave station bypass state to the slave station insert state when there is a no-communication state, as judged by the no-communication state detecting circuit, and the station is connected to the connection box, as judged by the slave station connection detecting circuit.

BRIEF DESCRIPTION OF THE DRAWINGS

FIGS. 3A-3C illustrate an output waveforms of a main circuit in the no-communication state detecting circuit shown in FIG. 2.

FIG. 4 illustrates a no-communication state detecting circuit according to another embodiment of the present invention.

FIG. 5 is a general diagram of a data communication system common to the embodiments of the present invention and the prior art.

DESCRIPTION OF THE PREFERRED EMBODIMENTS

One embodiment of the present invention may now be described with reference to FIGS. 1, 2 and 3, wherein the like numerals in the different views identify identical or corresponding parts. The invention operates within the environment of a closed loop data link system that has a ring-type network architecture identical to that of the background art in FIG. 5, already described. Accordingly, the network need not be again explained hereafter. The application of the invention to the network will be clear to one of ordinary skill in the art.

Figure 1:
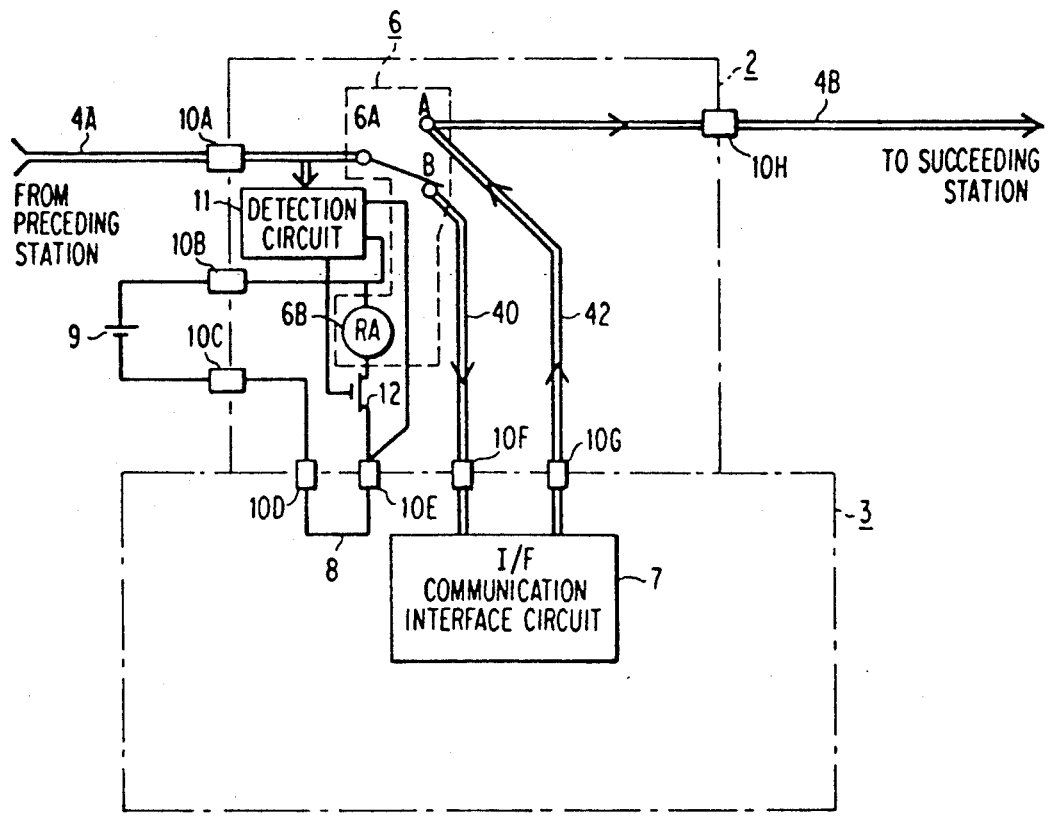
FIG. 1 is a block diagram illustrating a configuration of a data communication apparatus according to one embodiment of the present invention.

FIG. 1 is a block diagram illustrating the configuration of a data communication apparatus which comprises a connection box 2 connected in series between data transmission lines 4A and 4B, and a slave station (data communication terminal) 3 removably connectable with the connection box 2. In FIG. 1, a no-communication state detecting circuit 11 (hereinafter referred to as the "detecting circuit") is connected to the data transmission line 4A, which carries data sent by the master station 1. The circuit monitors a data string and detects the presence of an idle period, i.e., a no-communication state. A switching circuit 12 that can be switched on/off by an output of the detecting circuit 11 operates to switch on/off the switching device 6. A field effect transistor (FET) having a rapid-response switching characteristic is employed as the switching circuit 12 and an output signal from the detecting circuit 11 is input to a gate terminal (G) of the field effect transistor. A slave station connection detecting circuit for judging that the slave station 3 has been connected with the connection box 2 may be simply provided by the terminals 10D and 10E provided in the terminal box 2 and a jumper 8 provided in the slave station 3. The data transmission line switch comprises the switching device 6 and the FET 12. Power from supply 9 to device 6 is transmitted via jumper 8 and FET 12.

Figure 2:
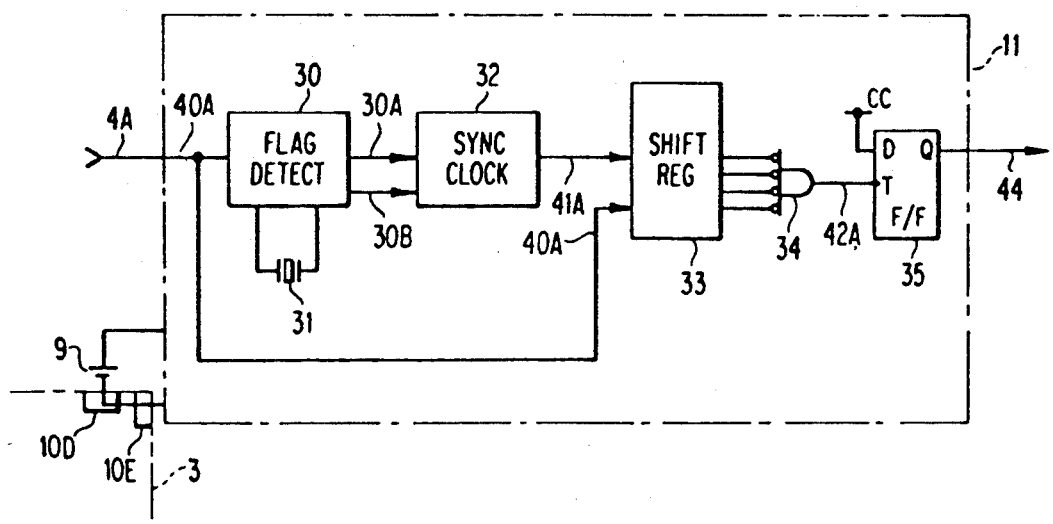
FIG. 2 is a block diagram illustrating a configuration of a no-communication state detecting circuit in the data communication apparatus shown in FIG. 1.

FIG. 2 is an internal block diagram of the detecting circuit 11 incorporated in the connection box 2. In FIG. 2, a flag detecting circuit 30 is connected to the data transmission line 4A from a preceding station and detects the presence of a flag part in the data string sent by the master station 1. A crystal oscillator 31 generates a clock that provides timing for the operation of the detecting circuit 11. Flag detecting circuit 30 is responsive to the clock and the data string to output a flag detecting signal 30A and a system clock 30B. A synchronous clock generating circuit 32 receives the flag detecting signal 30A and the system clock 30B, i.e., the output signals of the flag detecting circuit 30, and generates a clock 41A that is synchronized with the data string sent by the master station 1. A register 33 receives the stream of clock pulses 41A and the data string sent by the master station 1 on line 40A and shifts the data string in accordance with the synchronous clock pulse. In this manner, shift register 33 converts the shifted data into parallel data, and outputs the data string as parallel data. A NOR gate element (hereinafter referred to as the "NOR gate") has four NOR gate input terminals and receives from respective register stages four of the parallel data outputs from the shift register 33. While four input terminals are used by way of example, clearly additional terminals may be used; however, as previously noted, at least four "idle" bits are desired for proper operation of the system. The output signal 42A of the NOR gate 34 is "1" only when the parallel data all are "0". A D-T type flip-flop circuit 35 (hereinafter referred to as the "flip-flop") receives line voltage at its terminal D where "1" is held, and receives the output signal 42 of the NOR gate 34 at its terminal T. As previously noted, power supply 9 will apply a voltage to the detecting circuit 11 via jumper 8 when the slave station 3 is connected with the connection box 2.

Figure 6:
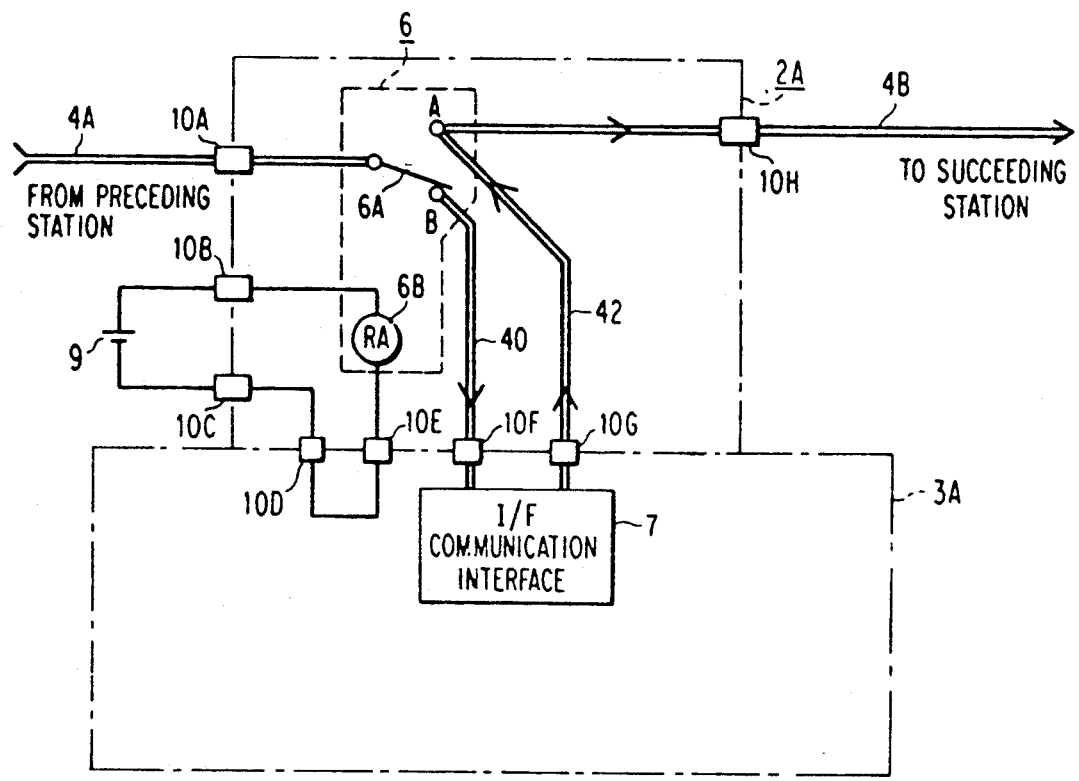
FIG. 6 is a configuration diagram illustrating a connection box and a slave station of the prior art data communication apparatus.

Operation of the data communication apparatus according to the first embodiment of the present invention may be described with reference to FIGS. 1, 2 and 3. In FIG. 1, when the slave station 3 is not connected to the connection box 2, the voltage of the switching device driving power supply 9 is not applied to the switching device 6 and contact 6A of the switching device 6 is in position A, because the terminals 10D and 10E are disconnected from each other as in the prior art shown in FIG. 6. Therefore, the data transmission line 4A is connected directly to the data transmission line 4B going to the next station in the ring via contact 6A of the switching device 6. Specifically, the connection box 2 is in a slave station bypass state and the data string sent by the master station is transmitted intact to the next station.

Figure 7:
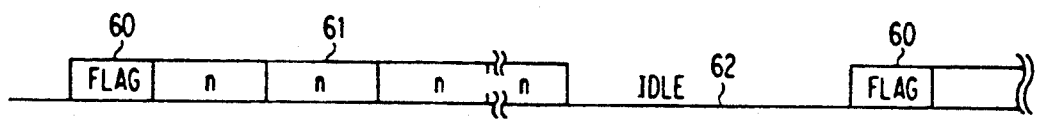
FIG. 7 illustrates a data transmission frame format common to the embodiments of the present invention and the prior art.
Figure 8:
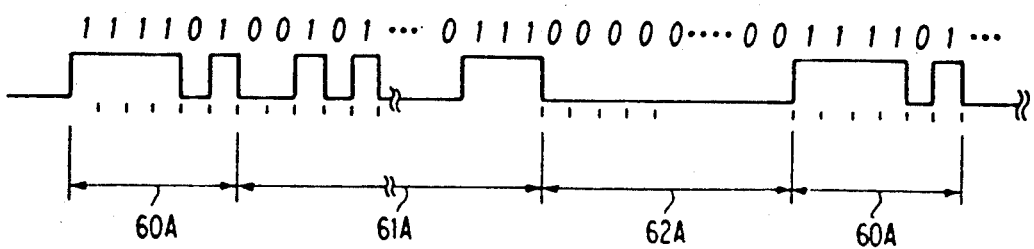
FIG. 8 illustrates details of the data transmission frame format shown in FIG. 7.

When the slave station 3 is connected with the connection box 2, the terminals 10D and 10E are connected with each other by the jumper 8 in the slave station 3, a voltage is applied to the detecting circuit 11 by the switching device driving power supply 9, and the detecting circuit 11 starts operation. At this time, the switching device 6 is not operated because the FET 12 is in an open state. The data string sent by the master station 1 has the content previously described with respect to FIG. 7, i.e., it is composed of a flag 60, a data part 61, and an idle space 62, indicating that a no-communication state is present between the transmitted data strings. The detecting circuit 11 detects the idle period 62 and outputs a detection signal for driving the FET 12. When the FET 12 is switched ON by the output signal of the detecting circuit 11, the voltage of the power supply 9 is applied to the switching device 6 to cause the switching device 6 to be operated, the contact 6A of the switching device 6 to move to position B, and the data transmission line 4A to be switched to the slave station 3 side and enter the slave station insert state. Since the switching device 6 needs to complete the switching operation within the idle period 62, a rapid-response switching characteristic is required. If the idle period 62 is sufficiently long, however, the response time of the switching device 6 need not be short.

Operation of the detecting circuit 11 illustrated in FIG. 2 will now be discussed. As described previously, the detecting circuit 11 detects the idle period 62 (no-communication state) from the data string sent by the master station 1 and operates the FET 12. When the slave station 3 is connected with the connection box 2, the voltage of the power supply 9 for operating the detecting circuit 11 is supplied, as described above, to make the detecting circuit 11 ready to operate. When the data string 40A sent by the master station 1 is entered into the detecting circuit 11 through the data transmission line 4A, the flag detecting circuit 30 detects the flag part 60 from the data string 40A and outputs the flag detection signal 30A to the synchronous clock generating circuit 32. In addition, the flag detection circuit 30 generates a system clock 30B for the detecting circuit 11 by means of the crystal oscillator 31 and outputs the clock signal to the synchronous clock generating circuit 32. When the flag detection signal 30A and the system clock 30B are input, the synchronous clock generating circuit 32 generates the synchronous clock 41 in synchronization with the data string 40A sent by the master station 1. The synchronous clock 41 has a leading edge (change) per trapezoidal pulse of the data string 40A sent by the master station 1. The data string 40A sent by the master station 1 is also input to the shift register 33, shifted thereby in accordance with the synchronous clock generating circuit 32, converted into parallel data, and output. This parallel data is entered into the NOR gate 34. The NOR gate shown in FIG. 2 outputs "1" when the parallel data from the shift register 33 has a succession of "0"s in four or more bits, i.e., outputs "1" on detection of the idle state 62. This signal is employed as trigger 42A for the flip-flop 35 and sets the flip-flop 35 to output an ON signal from an output terminal Q. This output signal of the flip-flop 35 is used as an idle state detection signal 44 to operate the FET 12.

FIGS. 3A-3C illustrate waveforms of typical parts in the detecting circuit block diagram shown in FIG. 2. FIG. 3A shows the data waveform 40A sent by the master station 1, including flag part 60, data part 61 and idle part 62. FIG. 3B shows the synchronous clock generated by the synchronous clock generating circuit 32 in response to the entry of the flag detection signal 30A and the system clock 30B. The synchronous clock 41A has a leading edge (change) per trapezoidal pulse. FIG. 3C shows a flip-flop clock waveform 42A output by the NOR gate 34. When entered, the signal 42A sets the flip-flop 35 and outputs the idle detection signal 44. As previously stated, when the slave station 3 is connected with the connection box 2 and the idle space 62 is detected once, the idle detection signal 44 is kept set, data communication is then started, and the flip-flop 35 is not reset and keeps the FET 12 operated. The flip-flop 35 is reset when the voltage of the power supply 9 is cut off, e.g., by disconnecting the slave station 3 from the connection box 2.

FIG. 4 is a block diagram illustrating a detecting circuit 11A according to a second embodiment of the present invention. This embodiment is different from the circuit 11 shown in FIG. 2 in that a power-on reset circuit 36 is provided at the input from the power supply 9. The power supply to the detecting circuit 11A may be unstable in accordance with the contact state of the terminals 10B and 10C when the slave station 3 is being connected with the connection box 2. To keep this transient fluctuation from affecting operation of circuit 11A, the reset circuit 36 monitors the power supply 9 and stabilizes the operation of circuit 11A by outputting a reset signal 43 to each circuit component for a predetermined period of time after the voltage of the power supply 9 is applied and exceeds a predetermined level. Referring to FIG. 4, after the slave station 3 has been connected with the connection box 2 and the voltage of the power supply 9 applied, the reset circuit 36 clears the the synchronous clock generating circuit 32 and the flip-flop 35 and resets the shift register 33 for a predetermined period of time. The voltage from source 9 must be higher than a threshold for a delay time before the reset function will be released. As a result, the effect of an unstable voltage can be avoided when the slave station 3 is first connected with the connection box 2.

It will be appreciated that the length of the parallel data sent from the shift register 33 to the NOR gate 34 may be increased as required, which length is four bits in the exemplitive detecting circuits 11 and 11A shown in FIGS. 2 and 4, respectively.

It will be further appreciated that any switching means capable of being controlled by the output of the detecting circuit 11 and of on/off controlling an energizing current of the switching device 6 may be employed instead of the rapid-response field effect transistor (FET) used as the switching circuit 12 in the preferred embodiment.

It also will be apparent that the invention, as described above, achieves an efficient data communication apparatus including a slave station connection detecting circuit for judging that a slave station has been connected with a connection box, a no-communication state detecting circuit for detecting a no-communication state of a ring-shaped data transmission network, and a data transmission line switching circuit for switching the data transmission line from a slave station bypass state to a slave station insert state, so that the data transmission line may be switched from the slave station bypass state to the slave station insert state without interrupting the data string when the slave station is connected with the connection box.

While the present invention has been described with respect to certain preferred embodiments, the present invention is not limited thereto but is intended to be defined by the appended claims.

What is claimed is:

1. A ring-type data communication network having plural nodes, comprising:
    a plurality of transmission means, each connecting respective pairs of nodes and collectively joining said nodes in said ring-type network;
    a master station located at a first of said nodes and operative to generate a transmission frame comprising an information space and an idle space;
    a plurality of slave stations, located at others of said nodes, at least one being a detachable slave station; and
    connection means located respectively at at least one of said nodes and being operative to switch between a slave station bypass state and a slave station insert state to detachably connect said at least one detachable slave station into said network in response to the appearance of said idle space.

2. The network of claim 1, wherein said connection means comprises:
    slave station connection detecting means for judging that a detachable slave station has been connected to said network at a respective node;
    idle space detecting means for detecting the presence of said idle space in a transmission frame transmitted by said master station; and
    switching means for switching said connection means from said slave station bypass state to said slave station insert state in response to the judgement of said idle space detecting means.

3. The network of claim 1, wherein a respective connection means is located at each of a plurality of nodes, each said connection means being operative to switch said switching means at a given time during transmission of said transmission frame through the respective node corresponding to said connection means.

4. The network of claim 2, wherein said idle space comprises a predetermined pattern of data and said idle space detecting means is operative to identify the presence of said pattern in a transmission frame.

5. The network of claim 3, wherein said transmission frame comprises a flag signal and said connection means further comprises means responsive to said flag signal to identify the presence of said transmission frame at a node and to provide a timing signal for operation of said connection means.

6. The network of claim 2, wherein said connection means comprises an input port, an output port and a detachable slave station connector with input and output terminals, said switching means being operative to connect said input port directly to said output port during said slave station bypass state and to connect said input port to said detachable slave station connector input terminal and to connect said slave station detachable connector output terminal to said output port during said slave station insert state.

7. A method of inserting a detachable slave station into a connection box disposed along a serial communication path in a ring-type data communication network having a plurality of slave stations and a master station operative to generate a transmission frame for communication with said slave stations, said frame having an idle space, the method comprising:
    detecting at said connection box the attachment of a detachable slave station;
    detecting at said connection box the presence of a transmission frame; and
    switching said connection box from a slave station bypass state to a slave station insert state in response to a detection of said idle space.

8. The method of claim 7 further comprising: establishing the timing of said transmission frame prior to detecting said idle space.

9. A data communication connection box for connection into a ring-shaped data transmission path and detachably connectable to a slave station that is operative to conduct data communication with a master station via a data string transmitted along said data transmission path, said connection box comprising:
    slave station connection detecting means for detecting that a slave station has been connected with said connection box;
    no-communication state detecting means for detecting a no-communication state within a data string transmitted by said master station via said data transmission path; and
    data transmission path switching means for switching said data transmission path from a slave station bypass state to a slave station insert state in accordance with a detection result of the no-communication state judged by said no-communication state detecting means.

10. The data communication connection box of claim 9, wherein said no-communication state detecting means comprises means for detecting a predetermined data pattern in said data string.

11. The data communication connection box of claim 10, wherein said no-communication state detecting means is responsive to the content of said data string to establish a timing for operating said switching means.

12. The data communication connection box of claim 10 further comprising reset circuit means responsive to an input voltage, generated by an external source, for outputting a reset signal to at least said no-communication state detecting means for a predetermined period of time, following said input voltage exceeding a threshold level.

13. The data communication connection box of claim 12, wherein said reset circuit means is responsive to the application of an input voltage by said external source when said slave station and said connection box are connected.

14. The data communication connection box of claim 9 wherein said no-communication state detecting means is operative in response to said slave station connection detecting means detecting a connection.

15. A ring-type data communication network having plural nodes, comprising:

a plurality of transmission means, each connecting respective pairs of nodes and collectively joining said nodes in said ring-type network;

a station located at a first of said nodes and operative to generate a transmission frame comprising an information space and an idle space;

a plurality of stations, located at others of said nodes, at least one being a detachable station; and a connection means located respectively at at least one of said nodes and being operative to switch between a station bypass state and a station insert state to detachably connect said at least one detachable station into said network in response to the appearance of said idle space.

* * * * *